(12) United States Patent
Wang et al.

(10) Patent No.: US 11,245,848 B2
(45) Date of Patent: Feb. 8, 2022

(54) METHOD OF CONTROLLING GIMBAL, GIMBAL AND UAV

(71) Applicant: SZ DJI TECHNOLOGY CO., LTD., Shenzhen (CN)

(72) Inventors: Yingzhi Wang, Shenzhen (CN); Shuai Liu, Shenzhen (CN); Guangyuan Lin, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/119,526

(22) Filed: Dec. 11, 2020

(65) Prior Publication Data

US 2021/0120176 A1    Apr. 22, 2021

Related U.S. Application Data

(63) Continuation of application No. PCT/CN2018/096612, filed on Jul. 23, 2018.

(51) Int. Cl.
| | |
|---|---|
| G03B 17/56 | (2021.01) |
| H04N 5/232 | (2006.01) |
| G05D 1/08 | (2006.01) |
| G05D 1/00 | (2006.01) |
| H04N 5/225 | (2006.01) |
| B64C 39/02 | (2006.01) |
| B64D 47/08 | (2006.01) |

(52) U.S. Cl.
CPC ....... *H04N 5/23258* (2013.01); *B64C 39/024* (2013.01); *B64D 47/08* (2013.01); *G03B 17/561* (2013.01); *G05D 1/0094* (2013.01); *G05D 1/0808* (2013.01); *H04N 5/225251* (2018.08); *B64C 2201/127* (2013.01); *B64C 2201/146* (2013.01)

(58) Field of Classification Search
CPC .. G03B 17/561; G05D 1/0094; G03D 1/0808; H04N 5/225251
See application file for complete search history.

(56) References Cited

U.S. PATENT DOCUMENTS 8,844,896 B2 *  9/2014  Pettersson ............... F16F 3/00
                                                     248/646

FOREIGN PATENT DOCUMENTS

| CN | 104035445 A | 9/2014 |
| CN | 104808674 A | 7/2015 |

(Continued)

OTHER PUBLICATIONS

The World Intellectual Property Organization (WIPO) International Search Report for PCT/CN2018/096612 dated Apr. 24, 2019 6 pages.

*Primary Examiner* — Minh Q Phan
(74) *Attorney, Agent, or Firm* — Anova Law Group, PLLC

(57) ABSTRACT

A method of controlling a gimbal mounted at an unmanned aerial vehicle (UAV) includes: obtaining a current attitude of the UAV and a current attitude of the gimbal at a current moment; predicting a flight speed of the UAV; and controlling the gimbal to rotate to maintain an angle of the gimbal relative to the UAV within a particular angle range according to the current attitude of the UAV, the current attitude of the gimbal, and the predicted flight speed of the UAV, such that a ratio of a propeller assembly of the UAV appearing in an image photographed by a capturing device mounted at the gimbal is lower than a pre-configured ratio threshold.

20 Claims, 3 Drawing Sheets

(56) References Cited

FOREIGN PATENT DOCUMENTS

| | | | |
|---|---|---|---|
| CN | 105373132 | A | 3/2016 |
| CN | 107074348 | A | 8/2017 |
| CN | 108163203 | A | 6/2018 |
| CN | 108253966 | A | 7/2018 |
| WO | 2018006424 | A1 | 1/2018 |
| WO | 2018082004 | A1 | 5/2018 |
| WO | 2018104829 | A1 | 6/2018 |

* cited by examiner

METHOD OF CONTROLLING GIMBAL, GIMBAL AND UAV

CROSS-REFERENCE TO RELATED APPLICATION

This application is a continuation of International Application No. PCT/CN2018/096612, filed on Jul. 23, 2018, the entire content of which is incorporated herein by reference.

TECHNICAL FIELD

The present disclosure relates to the technical field of gimbal control and, more particularly, to a method of controlling a gimbal, a gimbal, and an unmanned aerial vehicle (UAV).

BACKGROUND

Due to factors such as mechanical design and large viewing angle, when an existing UAV-mounted gimbal slowly rotates to follow movement of the UAV, a relative angle between the gimbal and the UAV gradually increases. After the relative angle between the gimbal and the UAV becomes greater than a certain angle threshold (e.g., 10°, the certain angle threshold varies with different UAV models), propellers may appear in images photographed by a capturing device mounted at the gimbal. When the propellers occupy a substantial portion in the photographed images, the photographed images are useless and re-photographing is needed. Thus, it is necessary to ensure that the relative angle between the gimbal and the UAV remains substantially small, which requires the gimbal to rapidly rotate to follow the movement of the UAV. However, if the follow speed of the gimbal is too high, then under when an attitude of the UAV is unstable (e.g., the UAV is hovering), even a slight shaking of the gimbal may be reflected in the photographed images. Therefore, it is necessary to optimize a strategy for rotating the gimbal to follow the movement of the UAV.

SUMMARY

In accordance with the disclosure, there is provided a method of controlling a gimbal mounted at an unmanned aerial vehicle (UAV). The method includes: obtaining a current attitude of the UAV and a current attitude of the gimbal at a current moment; predicting a flight speed of the UAV; and controlling the gimbal to rotate to maintain an angle of the gimbal relative to the UAV within a particular angle range according to the current attitude of the UAV, the current attitude of the gimbal, and the predicted flight speed of the UAV, such that a ratio of a propeller assembly of the UAV appearing in an image photographed by a capturing device mounted at the gimbal is lower than a pre-configured ratio threshold.

Also in accordance with the disclosure, there is provided a gimbal. The gimbal includes: an electric motor; an electronic speed controller (ESC) electrically connected to the electric motor; and a processor electrically connected to the ESC and configured to: obtain a current attitude of an unmanned aerial vehicle (UAV) to which the gimbal is mounted and a current attitude of the gimbal at a current moment; predict a flight speed of the UAV; and control the gimbal to rotate to maintain an angle of the gimbal relative to the UAV within a particular angle range according to the current attitude of the UAV, the current attitude of the gimbal, and the predicted flight speed of the UAV, such that a ratio of a propeller assembly of the UAV appearing in an image photographed by a capturing device mounted at the gimbal is lower than a pre-configured ratio threshold.

Also in accordance with the disclosure, there is provided an unmanned aerial vehicle (UAV). The UAV includes: a body; a propeller assembly configured to drive the body to move; a flight controller electrically connected to the propeller assembly; and a gimbal mounted at the body, including a gimbal controller, an electronic speed controller (ESC) electrically connected to the gimbal controller, and an electric motor electrically connected to the ESC. The flight controller is configured to obtain a current attitude of the UAV at a current moment, predict a flight speed of the UAV, and transmit the current attitude of the UAV and the predicted flight speed of the UAV to the gimbal controller. The gimbal controller is configured to obtain a current attitude of the gimbal at the current moment, and control the electric motor to rotate according to the current attitude of the UAV, the current attitude of the gimbal, and the predicted flight speed of the UAV to maintain an angle of the gimbal relative to the body within a particular angle range, such that a ratio of the propeller assembly appearing in an image photographed by a capturing device mounted at the gimbal is lower than a pre-configured ratio threshold.

BRIEF DESCRIPTION OF THE DRAWINGS

To more clearly illustrate the technical solution of the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

Figure 1:
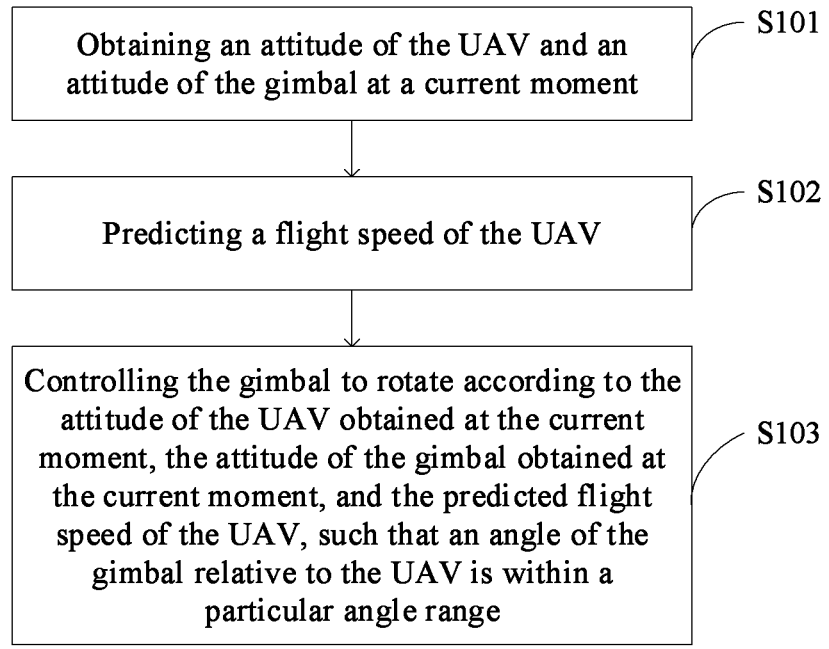
FIG. 1 is a schematic flow diagram of a method of controlling a gimbal or a UAV according to an example embodiment of the present disclosure.

Embodiments of the present disclosure are described in detail below with reference to the accompanying drawings. Same or similar reference numerals in the drawings represent the same or similar elements or elements having the same or similar functions throughout the specification. It will be appreciated that the described embodiments are some rather than all of the embodiments of the present disclosure. Other embodiments obtained by those having ordinary skills in the art on the basis of the described embodiments without inventive efforts should fall within the scope of the present disclosure.

Embodiments of the present disclosure are described in detail below with reference to the accompanying drawings. In the case of no conflict, the following embodiments and features of the embodiments can be combined with each other.

FIG. 1 is a schematic flow diagram of a method of controlling a gimbal according to an example embodiment of the present disclosure. The method of controlling the gimbal is executed by the gimbal 200, such as a gimbal controller or an independent controller provided at the gimbal 200. The gimbal 200 may be a one-axis gimbal, a two-axis gimbal, or a three-axis gimbal, which is not limited by the present disclosure. In addition, in the embodiments of the present disclosure, the gimbal 200 may be mounted at an unmanned aircraft, such as a UAV. The UAV will be used as an example in the description of the embodiment.

Figure 2:
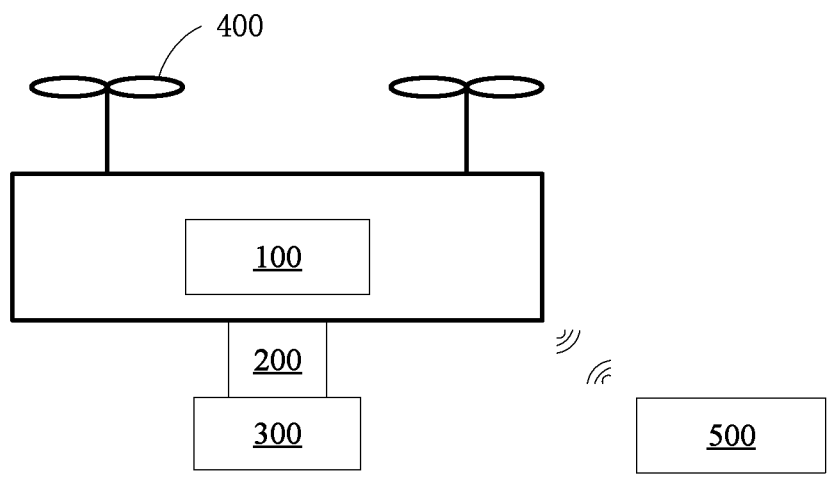
FIG. 2 is an application scenario diagram of the method of controlling the gimbal or the UAV according to an example embodiment of the present disclosure.

The UAV consistent with the embodiment of the present disclosure may be a multi-rotor UAV. Referring to FIG. 2, the UAV includes a flight controller 100, a gimbal 200, and a capturing device 300. The capturing device 300 is mounted at the body of the UAV through the gimbal 200.

The gimbal 200 may be a one-axis gimbal 200, a two-axis gimbal 200, a three-axis gimbal 200, or a four-axis gimbal 200. The capturing device 300 in this embodiment is not limited to a camera in a traditional sense. Specifically, the capturing device 300 may be an image capturing device or a camcorder (e.g., a camera, a camcorder, an infrared camera, an ultraviolet camera, or the like), an audio capturing device (e.g., a parabolic reflective microphone), and an infrared camera, etc. The capturing device 300 may provide static sensing data (e.g., pictures) or dynamic sensing data (e.g., videos).

The gimbal 200 is connected to the flight controller 100 through a communication interface, for example, a controller area network (CAN) bus or another communication interface. Through controlling rotation of the gimbal 200, the flight controller 100 controls rotation of the capturing device 300 mounted at the gimbal 200. In addition, in some embodiments, the capturing device is connected to the flight controller 100 through a communication interface. For example, the capturing device 300 may directly communicate with the flight controller 100 or the capturing device 300 may indirectly communicate with flight controller 100 through the gimbal 200. The flight controller 100 controls the operation of the capturing device 300 and obtains the images photographed by the capturing device 300.

In one embodiment, the UAV includes a propeller assembly 400. The propeller assembly 400 may include one or more rotors, propellers, blades, motors, and electronic speed controllers, etc. For example, the rotors of the propeller assembly 400 may be self-tightening rotors, rotor assemblies, or other rotating driving units. The UAV may include one or more propeller assemblies 400. All the propeller assemblies 400 may be the same type. Optionally, the one or more propeller assemblies 400 may be of different types. The propeller assembly 400 may be installed in any suitable position of the UAV, such as the top, the bottom, the front, the rear, the side, or any combination thereof. The one or more propeller assemblies 400 may be controlled to control the flight of the UAV.

In some embodiments, the UAV may be communicatively connected to a terminal 500. For example, the flight controller 100 may communicate with the terminal 500. The terminal 500 may send control data to one or more of the UAV, the gimbal 200, and the capturing device 300, and may receive information (e.g., position and/or movement information of the UAV, the gimbal 200, or the capturing device 300) from one or more of the UAV, the gimbal 200, and the capturing device 300.

The method of controlling the gimbal will be described in detail in the following. As shown in FIG. 1, the method of controlling the gimbal consistent with the embodiments of the present disclosure may include the following processes.

At S101: an attitude of the UAV and an attitude of the gimbal 200 at the current moment are obtained. The attitude of the UAV at the current moment is also referred to as a "current attitude of the UAV" and the attitude of the gimbal at the current moment is also referred to as a "current attitude of the gimbal."

In one embodiment, a first inertial measurement unit (IMU) (not shown) is provided at the gimbal 200 for detecting the attitude of the gimbal 200. The gimbal 200 in this embodiment directly obtains the attitude of the gimbal 200 at the current moment through the first IMU.

Further, a second IMU (not shown) is provided at the UAV for detecting the attitude of the UAV.

At S101, the gimbal 200 may passively receive real-time attitude of the UAV or may proactively obtain the real-time attitude of the UAV. For example, in one embodiment, S101 includes passively receiving the attitude of the UAV transmitted by the UAV according to a first specific frequency. After receiving the attitude of the UAV transmitted by the second IMU, the flight controller 100 of the UAV transmits the attitude of the UAV to the gimbal 200 according to the first specific frequency. The first specific frequency may be configured according to the actual needs. For example, the flight controller 100 may transmit the attitude of the UAV to the gimbal 200 at a frequency of every 1 second, 2 seconds, 3 seconds, or another time interval.

In another embodiment, S101 is executed after a first attitude request instruction is sent to the UAV. The gimbal 200 may proactively obtain the attitude of the UAV only when needed, thereby avoiding resource waste resulting from passively receiving the attitude of the UAV transmitted by the flight controller 100 when not needed.

At S102: a flight speed of the UAV is predicted.

In one embodiment, the UAV includes a controlled flight mode and an autonomous flight mode. In different flight modes, the flight speed is predicted in different ways. The two situations of the UAV in the controlled flight mode and the autonomous mode are described in the following.

(1) The UAV in the Controlled Flight Mode

In the controlled flight mode, the movement of the UAV is controlled by a remote-control device. For example, the remote-control device transmits control signals to the UAV to control the UAV to fly forward, backward, leftward, or rightward. In absence of the control signals transmitted by the remote-control device, the UAV is hovering. The remote-control device may be a remote controller or a terminal device installed with an APP for controlling the flight of the UAV through the APP. Further, the terminal device may be a mobile phone, a tablet computer, or another mobile device capable of installing the APP or may be an immobile device (e.g., a personal computer or PC) capable of installing the APP.

Figure 3:
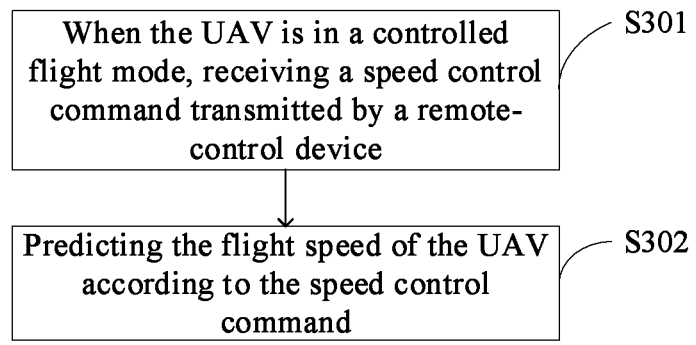
FIG. 3 is a schematic flow diagram of an implementation of the method of controlling the gimbal or the UAV according to an example embodiment of the present disclosure.

When the UAV is in the controlled flight mode, the flight speed of the UAV is determined by a speed control command from the remote-control device. Referring to FIG. 3, in one embodiment, when the UAV is in the controlled flight mode, predicting the flight speed of the UAV includes the following steps.

At S301, the speed control command transmitted by the remote-control device is received.

In this step, the gimbal 200 may indirectly obtain the speed control command transmitted by the remote-control device through the UAV.

At S302, the flight speed of the UAV is predicted according to the speed control command.

In one embodiment, the remote-control device is a remote controller. The speed control command includes a joystick value of the remote controller. The joystick value is used to indicate the flight speed of the UAV. In this case, the flight speed of the UAV is predicted according to the joystick value. Specifically, the greater the joystick value, the greater the flight speed of the UAV. The smaller the joystick value, the smaller the flight speed of the UAV.

(2) The UAV in the Autonomous Flight Mode

In the autonomous flight mode, the UAV autonomously flies according to position information of the UAV and/or a photographed target detected by a navigation system. For example, after the autonomous flight mode is activated, the UAV may autonomously control the flight of itself in the autonomous flight mode selected by a user according to a flight path configured in advance in a flight control system of the UAV or according to current position and attitude, and may achieve various flying states and effects without being controlled by the remote-control device. In one embodiment, the autonomous flight mode may include a diagonal mode, a circling mode, a spiral mode, a rapid ascending mode, or a comet circling mode, etc., and may also include a forced landing mode, for example, an automatic return-to-home event after a UAV flyaway occurs. Various autonomous flight modes of the UAV are described as follows, respectively.

In some embodiments, flight strategies corresponding to the diagonal mode may include: according to the position information of the target object (i.e., the photographed object), the UAV is controlled to initially fly in a horizontal plane (i.e., in a direction parallel to the ground) and then fly in a plane forming an angle with the horizontal plane. The angle may be determined according to the actual needs, for example, 45°. The target object may be photographed from different angles to obtain photographed images that are rich in contents. In addition, it should be noted that controlling the UAV to fly in the horizontal plane refers to that the UAV only has a flight speed in the horizontal direction but does not have a flight speed in the vertical direction (i.e., a direction vertical to the ground).

In some embodiments, flight strategies corresponding to the diagonal mode may include: according to the position information of the target object, the UAV is controlled to fly away from the target object in an S-shaped curve, such that the photographed images have beautiful composition. The curvature of the S-shaped curve may be configured as needed to satisfy the needs of photographing.

In some embodiments, the flight strategies corresponding to the circling mode may include: according to the position information of the target object, the UAV is controlled to fly around the target object at a specified distance. For example, the UAV may take the target object as a center and circle around the target object, such that the target object is photographed with 360° view. The shape of the flight path circling around the target object may be selected as needed, and may be a circle, an ellipse, or another suitable shape.

In some embodiments, the flight strategies corresponding to the spiral mode may include: according to the position information of the target object, the UAV is controlled to fly around the target object in a flight path resembling a Fibonacci spiral, a proportional spiral, an equiangular spiral, an Archimedes spiral, or another suitable spiral.

In some embodiments, the flight strategies corresponding to the rapid ascending mode may include: according to the position information of the target object, the UAV is controlled to ascend vertically after the UAV flies to a first pre-designated position relative to the target object at a pre-determined angle. The pre-determine dangle and the first pre-designated position, and the flight speed that the UAV ascends may be determined as needed, such that more versatile images may be photographed.

In some embodiments, the flight strategies corresponding to the comet circling mode may include: according to the position information of the target object, the UAV is controlled to approach the target object until a second pre-designated position and fly away from the target object after circling around the target object from the second pre-designated position. The second pre-designated position may be configured as needed. For example, the second pre-designated position may be located at the designated position having a particular distance from the target object and having a particular orientation relative to the target object. In addition, in this embodiment, the number of times the UAV circles around the target object after the UAV reaches the second designated position may be configured as needed, for example, one complete circle, multiple circles, or less than one complete circle.

Figure 4:
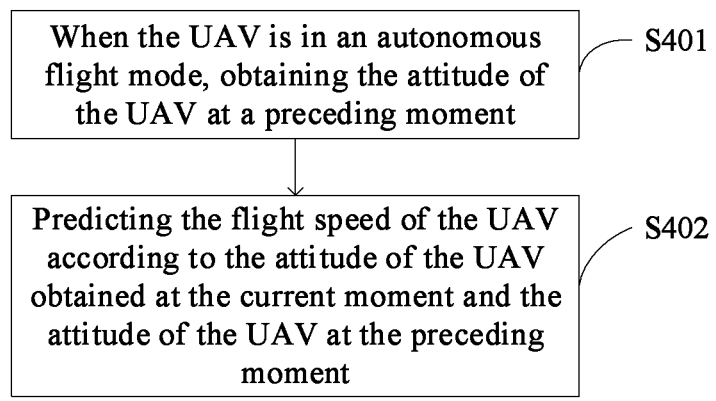
FIG. 4 is a schematic flow diagram of an implementation of the method of controlling the gimbal or the UAV according to another example embodiment of the present disclosure.

Referring to FIG. 4, when the UAV is in the autonomous flight mode, predicting the flight speed of the UAV includes the following.

At S401, an attitude of the UAV at a preceding moment is obtained. The attitude of the UAV at the preceding moment is also referred to as a "preceding attitude of the UAV."

At S402, predicting the flight speed of the UAV according to the attitude of the UAV obtained at the current moment (obtained at S101) and the attitude of the UAV obtained at the preceding moment.

Specifically, a difference calculation is performed on the attitude of the UAV obtained at the preceding moment and the attitude of the UAV obtained at the current moment to predict the flight speed of the UAV. In one embodiment, a first attitude difference of the UAV is determined between the current moment and the preceding moment according to the attitude of the UAV obtained at the current moment and the attitude of the UAV obtained at the preceding moment. According to the first attitude difference and a time difference between the current moment and the preceding moment, the flight speed of the UAV is predicted. The flight speed of the UAV is calculated by the following equation.

$$\text{Flight speed of UAV} = (\text{flight\_atti\_yaw}(t+1) - \text{flight\_atti\_yaw}(t))/\text{delta}\_t \quad (1)$$

In equation (1), t is the preceding moment, t+1 is the current moment, flight_atti_yaw(t) is the attitude of the UAV at the preceding moment, and flight_atti_yaw (t+1) is the attitude of the UAV at the current moment.

At S103, according to the attitude of the UAV and the attitude of the gimbal 200 obtained at the current moment, and the predicted flight speed of the UAV, the gimbal 200 is controlled to rotate, such that the angle of the gimbal 200 relative to the UAV is within a particular angle range. For example, the angle of the gimbal 200 relative to the angle of the UAV is less than or equal to 10°.

It should be noted that, in one embodiment, the angle of the gimbal 200 relative to the angle of the UAV refers to the angle between a yaw axis bracket of the gimbal 200 and the bottom of the UAV body.

Within the particular angle range, a ratio of the propeller assembly 400 occupying the image photographed by the capturing device 300 mounted at the gimbal 200 being lower than a pre-configured ratio threshold includes the following two scenarios.

In a first scenario, within the particular angle range, the propeller assembly 400 does not appear in the photographed image. In this case, the effect of the photographed image is better and the photographing experience of the user is more desirable.

In a second scenario, within the particular angle range, the propeller assembly 400 appears in the photographed image, but the ratio of the propeller assembly 400 occupying the photographed image is lower than the pre-configured ratio threshold. The photographed image may be processed (e.g., cropped) in a later stage, to remove the propeller assembly 400 from the photographed image. In this case, the effect of the photographed image is not as good as in the first scenario. But a control accuracy of rotating the gimbal 200 in the second scenario is lower than in the first scenario. It is easier to control the gimbal 200 to rotate to follow the movement of the UAV. The pre-configured ratio threshold may be configured according to actual needs, for example, 1%, 2%, 3%, 4%, 5%, 6%, 7%, 8%, 9%, 10%, 15%, or 20%, etc. It should be noted that, in the second scenario, the ratio threshold should not be substantially large. A substantially large ratio threshold results in that the propeller assembly 400 occupies a substantial portion of the photographed image. It may be difficult to remove the propeller assembly 400 through the image process in the later stage, or the photographed image is not usable after the removal, thereby degrading the photographing experience of the user.

Specifically, in the implementation of S103, a ratio coefficient K for representing how quickly the gimbal 200 rotates is determined first according to the predicted flight speed of the UAV. Then, according to the attitude of the UAV and the attitude of the gimbal 200 obtained at the current moment and the ratio coefficient K, the gimbal 200 is controlled to rotate. In one embodiment, K is positively correlated with the predicted flight speed of the UAV, that is, the faster the predicted flight speed of the UAV, the greater K, and the slower the predicted flight speed of the UAV, the smaller K. When the attitude of the UAV and the attitude of the gimbal 200 obtained at the current moment remain constant, a greater K results in a faster rotation speed of the gimbal 200 and a tighter following of the UAV by the gimbal 200, and a smaller K results in a slower rotation speed of the gimbal 200 and a smoother following of the UAV by the gimbal 200, thereby ensuring stability of the photographed image, which is suitable for the UAV in a hovering state or flying slowly.

When the UAV is in the controlled flight mode, for example, the UAV is controlled to fly by the remote controller, the greater the joystick value of the remote controller, the greater the predicted flight speed of the UAV, and the smaller the joystick value of the remote controller, the smaller the predicted flight speed of the UAV. In one embodiment, the joystick value is forward fed to the rotation of the gimbal 200 to control the gimbal 200 to follow the UAV. Thus, when the UAV moves fast, the ratio of the propeller assembly 400 occupying the photographed image is ensured to be lower than the pre-configured ratio threshold, and when the UAV is hovering or moves slowly, the stability of the photographed image is ensured.

When the UAV is in the autonomous flight mode, according to the attitude of the UAV obtained at the current moment and the attitude of the UAV obtained at the preceding moment, the flight speed of the UAV is predicted, and the predicted flight speed of the UAV is forward fed to the rotation of the gimbal 200. The faster the flight speed, the greater K and the faster the gimbal 200 follows, such that the ratio of the propeller assembly 400 occupying the photographed image is ensured to be lower than the pre-configured ratio threshold. When the flight speed is zero (the UAV is hovering) or substantially slow, the gimbal 200 follows slowly, such that the stability of the photographed image is ensured.

Further, K and the predicted flight speed of the UAV may have a linear mapping relationship or a curve mapping relationship. Specifically, the mapping relationship between K and the predicted flight speed of the UAV may be selected according to the actual needs. For example, in one embodiment, K and the predicted flight speed of the UAV have a linearly proportional mapping relationship to ensure the consistency of the speed of the gimbal 200 following the UAV. Thus, the stability of the photographed image is ensured.

When the gimbal 200 is controlled to follow the UAV, a second attitude difference is determined first according to the attitude of the UAV and the attitude of the gimbal 200 obtained at the current moment. Then, according to K and the second attitude difference, the rotation speed of the gimbal 200 is determined. Further, according to the rotation speed of the gimbal 200, the gimbal 200 is controlled to rotate. In one embodiment, the greater the second attitude difference, the greater K, the faster the rotation speed of the gimbal 200, and the tighter the gimbal 200 follows to ensure the ratio of the propeller assembly 400 occupying the photographed image is lower than the pre-configured ratio threshold. On the contrary, the smaller the second attitude difference, the smaller K, the slower the rotation speed of the gimbal 200, and the smoother the gimbal 200 follows to ensure the stability of the photographed image.

In one embodiment, second attitude difference=(UAV attitude at current moment−gimbal 200 attitude), and UAV rotation speed=K*second attitude difference. It should be noted that the equations of calculating the second attitude difference and the gimbal 200 rotation speed are not limited to the above described equations. Certain error factors may be considered to further improve the above described equations.

The gimbal control method consistent with the embodiments of the present disclosure may be suitable for photographing scenes with target switching. For example, the photographed target is switched from A to B, and the UAV needs to move from the position corresponding to A to the position corresponding to B to obtain the photographed image with desirable composition. The gimbal 200 needs to rotate to follow the UAV such that A and B can each be located at a certain position of the photographed image, such as the center position. During the process, the predicted flight speed of the UAV moving from the position corresponding to A to the position corresponding to B is forward fed to the rotation of the gimbal 200 to ensure that the ratio of the propeller assembly 400 occupying the photographed image is lower than the pre-configured ratio threshold.

The gimbal control method consistent with the embodiments of the present disclosure controls the rotation of the gimbal 200 according to the predicted flight speed of the UAV, the attitude of the UAV at the current moment, and the attitude of the gimbal 200 at the current moment, such that the angle of the gimbal 200 relative to the body of the UAV is within the particular angle range, the ratio of the propeller assembly 400 occupying the photographed image is substantially small, or the propeller assembly 400 does not appear in the photographed image. Thus, it is ensured that the photographed image is usable and the photographing experience of the user is desirable. Moreover, when the UAV is hovering or is flying slowly, the above described method of controlling the gimbal 200 to rotate is able to ensure the stability of the photographed image and to improve the photographing quality and the photographing experience of the user.

Figure 5:
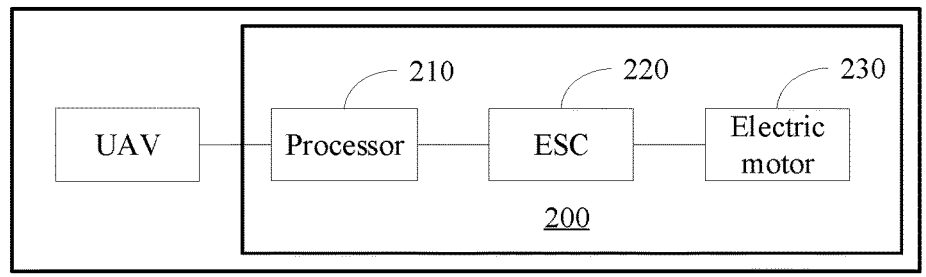
FIG. 5 is a schematic structural diagram of the gimbal according to an example embodiment of the present disclosure.

The present disclosure provides another gimbal. Referring to FIG. 5, in this embodiment, the gimbal 200 includes an electric motor 230, an electronic speed controller (ESC) 220, and a processor 210. The ESC 220 is electrically connected to the electric motor 230. The processor 210 is electrically connected to the ESC 220. The processor 210 is electrically connected to the UAV.

The processor 210 may be a central processing unit (CPU). The processor 210 may further include a hardware chip. The hardware chip may be application-specific integrated circuit (ASIC), programmable logic device (PLD), or a combination thereof. The PLD may be complex programmable logic device (CPLD), field-programmable gate array (FPGA), generic array logic (GAL), or any combination thereof.

Figure 7:
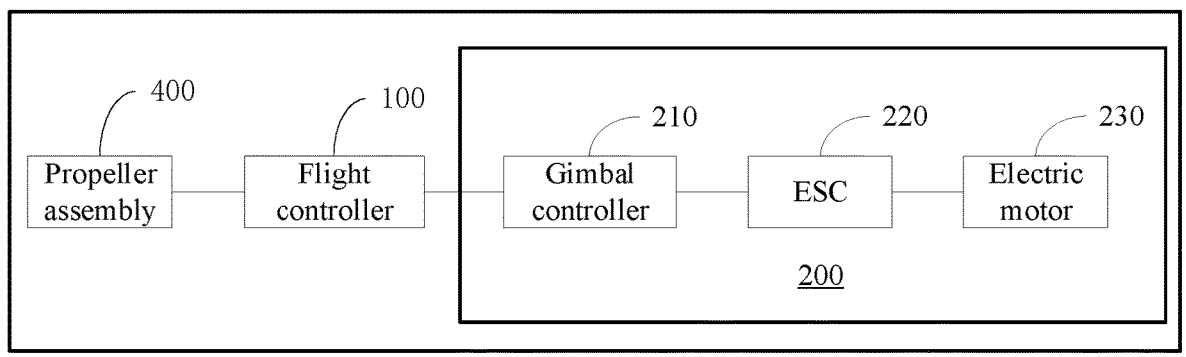
FIG. 7 is a schematic structural diagram of an implementation of the UAV according to an example embodiment of the present disclosure.

Further, the processor 210 may be a gimbal controller (as shown in FIG. 7) or may be an independent controller provided at the gimbal 200.

In one embodiment, the processor 210 is used to: obtain the attitude of the UAV and the attitude of the gimbal 200 at the current moment, predict the flight speed of the UAV, and control the gimbal 200 to rotate according to the attitude of the UAV and the attitude of the gimbal 200 obtained at the current moment and the predicted flight speed of the UAV, such that the angle of the gimbal 200 relative to the UAV is located within the particular angle range. Within the particular angle range, the ratio of the propeller assembly 400 appearing in the image photographed by the capturing device 300 mounted at the gimbal 200 is lower than the pre-configured ratio threshold.

In one embodiment, the processor 210 may implement the corresponding methods shown in FIG. 1, FIG. 3, and FIG. 4 of the present disclosure. For details, refer to the description in the first embodiment, and details are not repeated herein.

In addition, in one embodiment, the gimbal 200 may also include a storage device. The storage device may also be used to store program instructions. The processor 210 may call the program instructions to implement the corresponding methods shown in FIG. 1, FIG. 3, and FIG. 4.

The storage device may include volatile memory, such as random-access memory (RAM). The storage device may also include non-volatile memory, such as flash memory, hard disk drive (HDD), or solid-state drive (SSD). The storage device may also include combinations of various above described memories.

The gimbal 200 consistent with the embodiments of the present disclosure may be controlled to rotate according to the predicted flight speed of the UAV, the attitude of the UAV at the current moment, and the attitude of the gimbal 200 at the current moment, such that the angle of the gimbal 200 relative to the body is within the particular angle range, and the ratio of the propeller assembly 400 occupying the photographed image is ensured to be substantially small or the propeller assembly 400 does not appear in the photographed image. Thus, it is ensured that the photographed image is usable and the photographing experience of the user is desirable. Moreover, when the UAV is hovering or is flying slowly, the above described method of controlling the gimbal 200 to rotate may ensure the stability of the photographed image and may improve the photographing quality and the photographing experience of the user.

FIG. 1 is a schematic flow diagram of a method of controlling a UAV according to the embodiments of the present disclosure. The method of controlling the UAV is executed by the UAV carrying the gimbal 200, such as the flight controller 100, a combination of the flight controller 100 and the gimbal controller, or an independent controller provided at the UAV.

The UAV consistent with the embodiments of the present disclosure may be a multi-rotor UAV. Referring to FIG. 2, the UAV includes a body, a propeller assembly 400 for driving the body to move, and a gimbal 200 mounted at the body. The gimbal 200 is mounted with a capturing device 300. For details of the structures of the UAV, refer to the above description in the first embodiment, and details are not repeated herein.

The method of controlling the UAV is described in detail in the following embodiments. As shown in FIG. 1, the method of controlling the UAV includes the following.

At S101, the attitude of the UAV and the attitude of the gimbal 200 at the current moment are obtained.

In the first embodiment, the gimbal 200 directly obtains the attitude of the gimbal 200 at the current moment through the first IMU provided at the gimbal 200. Different from the first embodiment, in this embodiment, the UAV obtains the attitude of the gimbal 200 at the current moment through the gimbal 200, i.e., the UAV indirectly obtains the attitude of the gimbal. The UAV may proactively obtain the attitude of the gimbal 200 at the current moment from the gimbal 200. For example, when needed, the UAV may transmit a second attitude request command to the gimbal 200 to obtain the attitude of the gimbal 200 at the current moment. Alternatively, the UAV may passively receive the attitude of the gimbal 200 transmitted by the gimbal 200 at a second specific frequency. For example, the gimbal 200 may transmit the attitude of the gimbal 200 detected by the first IMU to the UAV at the second specific frequency (e.g., every 1 second, 2 seconds, 3 seconds, etc.)

In addition, in the first embodiment, the gimbal 200 indirectly obtains the attitude of the UAV at the current moment through the UAV. In this embodiment, the UAV directly obtains the attitude of the UAV at the current moment through the second IMU provided at the UAV.

Optionally, S101 of obtaining the attitude of the UAV at the current moment may be executed by the flight controller 100 while S101 of obtaining the attitude of the gimbal 200 at the current moment may be executed by the gimbal controller.

At S102, the flight speed of the UAV is predicted.

Optionally, S102 may be executed by the flight controller 100.

When the UAV is in the controlled flight mode, in the first embodiment, the gimbal 200 indirectly obtains the speed control command transmitted by the remote-control device. In this embodiment, the UAV directly receives the speed control command transmitted by the remote-control device.

At S103, according to the attitude of the UAV and the attitude of the gimbal 200 obtained at the current moment, and the predicted flight speed of UAV, the gimbal 200 is controlled to rotate, such that the angle of the gimbal 200 relative to the body is within the particular angle range.

Within the particular angle range, the ratio of the propeller assembly 400 appearing in the image photographed by the capturing device 300 mounted at the gimbal 200 is lower than the pre-configured ratio threshold.

Optionally, S103 may be executed by the flight controller 100, by the gimbal controller, or by a combination of the flight controller 100 and the gimbal controller. When S103 is executed by the combination of the flight controller 100 and the gimbal controller, the flight controller 100 determines the rotation speed of the gimbal 200 according to the attitude of the UAV and the attitude of the gimbal 200 at the current moment, and the predicted flight speed of the UAV, and transmits the rotation speed of the gimbal 200 to the gimbal controller. The gimbal controller controls the gimbal 200 to rotate according to the rotation speed of the gimbal 200.

Other parts of the operation principle of the method of controlling the UAV in the embodiment are similar to the above described embodiments, and details are not repeated herein.

The gimbal 200 consistent with the embodiments of the present disclosure may be controlled to rotate according to the predicted flight speed of the UAV, the attitude of the UAV at the current moment, and the attitude of the gimbal 200 at the current moment, such that the angle of the gimbal 200 relative to the body is within the particular angle range, and the ratio of the propeller assembly 400 occupying the photographed image is ensured to be substantially small or the propeller assembly 400 does not appear in the photographed image. Thus, it is ensured that the photographed image is usable and the photographing experience of the user is desirable. Moreover, when the UAV is hovering or is flying slowly, the above described method of controlling the gimbal 200 to rotate may ensure the stability of the photographed image and may improve the photographing quality and the photographing experience of the user.

Figure 6:
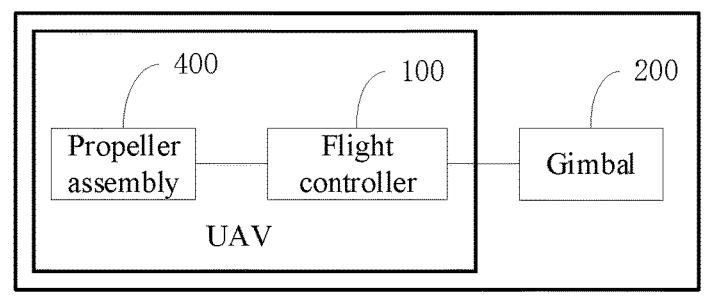
FIG. 6 is a schematic structural diagram of the UAV according to an example embodiment of the present disclosure.

Combining FIG. 2, FIG. 6, and FIG. 7, the present disclosure provides a UAV. The UAV includes a body, a propeller assembly 400, a flight controller 100, and a gimbal 200. The propeller assembly 400 is used to drive the body to move. The flight controller 100 is electrically connected to the propeller assembly 400 to drive the body to move. The gimbal 200 is mounted at the body. The gimbal 200 includes a gimbal controller, an ESC 220 electrically connected to the gimbal controller, and an electric motor 230 electrically connected to the ESC 220. The gimbal controller is electrically connected to the flight controller 100.

In one embodiment, the flight controller 100 is configured to obtain the attitude of the UAV at the current moment, predict the flight speed of the UAV, and transmit the attitude of the UAV at the current moment and the predicted flight speed of the UAV to the gimbal controller.

The gimbal controller is configured to obtain the attitude of the gimbal 200 at the current moment and control the electric motor 230 to rotate according to the received attitude of the UAV at the current moment, the obtained attitude of the gimbal 200 at the current moment, and the predicted flight speed of the UAV, such that the angle of the gimbal 200 relative to the body is within the particular angle range.

Within the particular angle range, the ratio of the propeller assembly 400 appearing in the image photographed by the capturing device 300 mounted at the gimbal 200 is lower than the pre-configured ratio threshold.

In one embodiment, when the UAV is in the controlled flight mode, the flight controller 100 is configured to: receive a speed control command transmitted by the remote-control device and predict a flight speed of the UAV according to the speed control command. When the UAV is in the controlled flight mode, the movement of the UAV is controlled by the remote-control device.

In one embodiment, the remote-control device is a remote controller. The speed control command includes: a joystick value of the remote controller. The flight controller 100 is configured to predict the flight speed of the UAV according to the joystick value.

In one embodiment, when the UAV is in the autonomous flight mode, the flight controller 100 is configured to: obtain the attitude of the UAV at a preceding moment, and predict the flight speed of the UAV according to the attitude of the UAV obtained at the current moment and the attitude of the UAV obtained at the preceding moment.

In one embodiment, the flight controller 100 is configured to: perform a difference calculation on the attitude of the UAV obtained at the current moment and the attitude of the UAV obtained at the preceding moment to predict the flight speed of the UAV.

In one embodiment, the flight controller 100 is configured to: determine a first attitude difference of the UAV between the current moment and the preceding moment according to the attitude of the UAV obtained at the current moment and the attitude of the UAV obtained at the preceding moment, and predict the flight speed of the UAV according to the first attitude difference and a time difference between the current moment and the preceding moment.

In one embodiment, the autonomous flight mode includes: a diagonal mode, a circling mode, a spiral mode, a rapid ascending mode, or a comet circling mode.

In one embodiment, the gimbal controller is configured to: perform a difference calculation on the attitude of the UAV obtained at the current moment and the attitude of the UAV obtained at the preceding moment to predict the flight speed of the UAV.

In one embodiment, the gimbal controller is configured to: determine a ratio coefficient for representing how quickly the gimbal 200 rotates according to the predicted flight speed of the UAV, and control the gimbal 200 to rotate according to the attitude of the UAV and the attitude of the gimbal 200 obtained at the current moment and the ratio coefficient.

In one embodiment, the ratio coefficient is positively correlated with the predicted flight speed of the UAV.

In one embodiment, the ratio coefficient and the predicted flight speed of the UAV have a linear mapping relationship or a curve mapping relationship.

In one embodiment, the gimbal controller is configured to: determine a second attitude difference according to the attitude of the UAV and the attitude of the gimbal 200 obtained at the current moment, determine the rotation speed of the gimbal 200 according to the ratio coefficient and the second attitude difference, and control the gimbal 200 to rotate according to the rotation speed of the gimbal 200.

In one embodiment, the gimbal 200 is provided with a first IMU. The gimbal controller is configured to: obtain the attitude of the gimbal 200 at the current moment through the first IMU.

In one embodiment, the body of the UAV is provided with a second IMU. The gimbal controller is configured to: obtain the attitude of the UAV at the current moment through the second IMU.

For details, refer to the description of the method of controlling the UAV in the above described embodiments, and details are not repeated herein.

The UAV consistent with the embodiments of the present disclosure may control the gimbal 200 to rotate according to the predicted flight speed of the UAV, the attitude of the UAV at the current moment, and the attitude of the gimbal 200 at the current moment, such that the angle of the gimbal 200 relative to the body is within the particular angle range, and the ratio of the propeller assembly 400 occupying the photographed image is ensured to be substantially small or the propeller assembly 400 does not appear in the photographed image. Thus, it is ensured that the photographed image is usable and the photographing experience of the user is desirable. Moreover, when the UAV is hovering or is flying slowly, the above described method of controlling the gimbal 200 to rotate may ensure the stability of the photographed image and may improve the photographing quality and the photographing experience of the user.

In addition, the embodiments of the present disclosure also provide a computer-readable storage medium. The computer-readable storage medium stores program instructions. When being executed by the processor, the program instructions are configured to execute the methods of controlling the gimbal 200 or the UAV in the above embodiments.

A person of ordinary skill in the art may understand that all or part of the processes in the above described method embodiments may be implemented by instructing relevant hardware through a computer program. The computer program may be stored in a computer-readable storage medium. When being executed, the computer program may include the processes of the above described method embodiments. The computer-readable storage medium may be a magnetic disk, an optical disk, a read-only memory (ROM), or a random-access memory (RAM).

The above disclosed are only some of the embodiments of the present disclosure, which of course may not be used to limit the scope of the present disclosure. Therefore, equivalent changes made according to the claims of the present disclosure still fall within the scope of the present disclosure.

What is claimed is:

1. A method of controlling a gimbal mounted at an unmanned aerial vehicle (UAV) comprising:
    obtaining a current attitude of the UAV and a current attitude of the gimbal at a current moment;
    predicting a flight speed of the UAV; and
    controlling the gimbal to rotate to maintain an angle of the gimbal relative to the UAV within a particular angle range according to the current attitude of the UAV, the current attitude of the gimbal, and the predicted flight speed of the UAV, such that a ratio of a propeller assembly of the UAV appearing in an image photographed by a capturing device mounted at the gimbal is lower than a pre-configured ratio threshold.

2. The method of claim 1, wherein predicting the flight speed of the UAV comprises, in response to the UAV being in a controlled flight mode in which movement of the UAV is controlled by a remote-control device:
    receiving a speed control command transmitted by the remote-control device; and
    predicting the flight speed of the UAV according to the speed control command.

3. The method of claim 2, wherein:
    the remote-control device includes a remote controller;
    the speed control command includes a joystick value of the remote controller; and
    predicting the flight speed of the UAV according to the speed control command comprises:
        predicting the flight speed of the UAV according to the joystick value.

4. The method of claim 1, wherein predicting the flight speed of the UAV comprises, in response to the UAV being in an autonomous flight mode:
    obtaining a preceding attitude of the UAV at a preceding moment; and
    predicting the flight speed of the UAV according to the current attitude of the UAV and the preceding attitude of the UAV.

5. The method of claim 4, wherein predicting the flight speed of the UAV according to the current attitude of the UAV and the preceding attitude of the UAV comprises:
    performing a difference calculation on the current attitude of the UAV and the preceding attitude of the UAV to predict the flight speed of the UAV.

6. The method of claim 5, wherein performing the difference calculation on the current attitude of the UAV and the preceding attitude of the UAV to predict the flight speed of the UAV comprises:
    determining an attitude difference of the UAV between the current moment and the preceding moment according to the current attitude of the UAV and the preceding attitude of the UAV; and
    predicting the flight speed of the UAV according to the attitude difference and a time difference between the current moment and the preceding moment.

7. The method of claim 4, wherein the autonomous flight mode comprises:
    a diagonal mode, a circling mode, a spiral mode, a rapid ascending mode, or a comet circling mode.

8. The method of claim 1, wherein controlling the gimbal to rotate according to the current attitude of the UAV, the current attitude of the gimbal, and the predicted flight speed of the UAV comprises:
    determining a ratio coefficient for representing how quickly the gimbal rotates according to the predicted flight speed of the UAV; and
    the current attitude of the gimbal, and the ratio coefficient, controlling the gimbal to rotate according to the current attitude of the UAV.

9. The method of claim 8, wherein:
    the ratio coefficient is positively correlated with the predicted flight speed of the UAV.

10. The method of claim 9, wherein:
    the ratio coefficient and the predicted flight speed of the UAV have a linear mapping relationship or a curve mapping relationship.

11. The method of claim 8, wherein controlling the gimbal to rotate according to the current attitude of the UAV, the current attitude of the gimbal, and the ratio coefficient comprises:
    determining an attitude difference according to the current attitude of the UAV and the current attitude of the gimbal;
    determining a rotation speed of the gimbal according to the ratio coefficient and the attitude difference; and
    controlling the gimbal to rotate according to the rotation speed of the gimbal.

12. The method of claim 1, wherein obtaining the current attitude of the UAV comprises:
    passively receiving the current attitude of the UAV transmitted by the UAV according to a specific frequency.

13. The method of claim 1, wherein obtaining the current attitude of the UAV is performed after an attitude request command is transmitted to the UAV.

14. The method of claim 1, wherein:
the gimbal is provided with an inertial measurement unit (IMU); and
obtaining the current attitude of the gimbal comprises:
obtaining the current attitude of the gimbal through the IMU.

15. A gimbal comprising:
an electric motor;
an electronic speed controller (ESC) electrically connected to the electric motor; and
a processor electrically connected to the ESC and configured to:
obtain a current attitude of an unmanned aerial vehicle (UAV) to which the gimbal is mounted and a current attitude of the gimbal at a current moment;
predict a flight speed of the UAV; and
control the gimbal to rotate to maintain an angle of the gimbal relative to the UAV within a particular angle range according to the current attitude of the UAV, the current attitude of the gimbal, and the predicted flight speed of the UAV, such that a ratio of a propeller assembly of the UAV appearing in an image photographed by a capturing device mounted at the gimbal is lower than a pre-configured ratio threshold.

16. The gimbal of claim 15, wherein the processor is further configured to, in response to the UAV being in a controlled flight mode in which movement of the UAV is controlled by a remote-control device:
receive a speed control command transmitted by the remote-control device; and
predict the flight speed of the UAV according to the speed control command.

17. The gimbal of claim 16, wherein:
the remote-control device includes a remote controller;
the speed control command includes a joystick value of the remote controller; and
the processor is further configured to:
predict the flight speed of the UAV according to the joystick value.

18. The gimbal of claim 15, wherein the processor is further configured to, in response to the UAV being in an autonomous flight mode:
obtain a preceding attitude of the UAV at a preceding moment; and
predict the flight speed of the UAV according to the current attitude of the UAV and the preceding attitude of the UAV.

19. The gimbal of claim 18, wherein the processor is further configured to:
perform a difference calculation on the current attitude of the UAV and the preceding attitude of the UAV to predict the flight speed of the UAV.

20. An unmanned aerial vehicle (UAV) comprising:
a body;
a propeller assembly configured to drive the body to move;
a flight controller electrically connected to the propeller assembly; and
a gimbal mounted at the body, including a gimbal controller, an electronic speed controller (ESC) electrically connected to the gimbal controller, and an electric motor electrically connected to the ESC;
wherein:
the flight controller is configured to obtain a current attitude of the UAV at a current moment, predict a flight speed of the UAV, and transmit the current attitude of the UAV and the predicted flight speed of the UAV to the gimbal controller; and
the gimbal controller is configured to obtain a current attitude of the gimbal at the current moment, and control the electric motor to rotate according to the current attitude of the UAV, the current attitude of the gimbal, and the predicted flight speed of the UAV to maintain an angle of the gimbal relative to the body within a particular angle range, such that a ratio of the propeller assembly appearing in an image photographed by a capturing device mounted at the gimbal is lower than a pre-configured ratio threshold.

* * * * *